(12) United States Patent
Tsubaki et al.

(10) Patent No.: US 8,077,923 B2
(45) Date of Patent: Dec. 13, 2011

(54) IMAGE PROCESSING APPARATUS AND IMAGE PROCESSING METHOD

(75) Inventors: Hidetoshi Tsubaki, Utsunomiya (JP); Mitsuhiro Saito, Utsunomiya (JP); Takahiro Oshino, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 958 days.

(21) Appl. No.: 12/040,396

(22) Filed: Feb. 29, 2008

(65) Prior Publication Data

US 2008/0219574 A1    Sep. 11, 2008

(30) Foreign Application Priority Data

Mar. 6, 2007    (JP) ................. 2007-055381

(51) Int. Cl.
*G06K 9/00*    (2006.01)
(52) U.S. Cl. ...................... 382/107; 382/276
(58) Field of Classification Search ............. 382/107, 382/276
See application file for complete search history.

(56) References Cited

U.S. PATENT DOCUMENTS

| | | | | |
|---|---|---|---|---|
| 5,731,819 A | * | 3/1998 | Gagne et al. | 345/647 |
| 6,049,354 A | * | 4/2000 | Sekine et al. | 348/208.6 |
| 7,847,823 B2 | * | 12/2010 | Habuka et al. | 348/208.4 |
| 2003/0142098 A1 | * | 7/2003 | Kim et al. | 345/475 |
| 2005/0074154 A1 | * | 4/2005 | Georgescu et al. | 382/128 |
| 2005/0206739 A1 | | 9/2005 | Kamoshida | 348/208.99 |

FOREIGN PATENT DOCUMENTS

JP    2005-269419 A    9/2005

OTHER PUBLICATIONS

R. Hartley, et al., "Multiple View Geometry in Computer Vision," in Projective Geometry and Transformations of 2D, pp. 11-23, 2000.

* cited by examiner

*Primary Examiner* — Tom Y Lu
(74) *Attorney, Agent, or Firm* — Fitzpatrick, Cella, Harper & Scinto

(57) ABSTRACT

An image processing apparatus includes a first processing part selecting motion detection points for detecting a motion between images, and acquiring first motion vectors that are local motion vectors at the motion detection points, a second processing part acquiring first representative motions that are representative motions of translation, scaling and rotation based on the first motion vectors, a third processing part eliminating components of the first representative motions from the first motion vectors and acquiring second motion vectors, a fourth processing part acquiring local foreshortening motions at the motion detection points from the second motion vectors, and a fifth processing part acquiring a second representative motion that is a representative foreshortening motion from the local foreshortening motions. This process can obtain information representing geometric deformation between the images by simple processing.

12 Claims, 13 Drawing Sheets

IMAGE PROCESSING APPARATUS AND IMAGE PROCESSING METHOD

BACKGROUND OF THE INVENTION

The present invention relates to an image processing apparatus and an image processing method for acquiring information on geometric deformation between frame images generated by the relative motion between an image-pickup apparatus and an object when a moving image is captured.

For an image-pickup apparatus, such as a video camera, various technology methods for correcting image shaking caused by camera shaking such as hand jiggling, have been proposed. Particularly, a so-called electronic image stabilization for detecting motion information from an image to electronically correct the image shaking is essential as a means for realizing image stabilization technology at a low cost.

Further, there are also a variety of technology methods for detecting motions from the image. As one of the methods, Japanese Patent Laid-Open No. 2005-269419 proposes an image processing method for detecting a plurality of motion vectors between frame images constituting a moving image to acquire the motion information (representative motion) representing a whole image from the motion vectors.

The term 'motion vector' as used herein is a vector amount representing the magnitude and direction of displacement of a local feature point (also referred to as an attention point, which mostly corresponds to an attention pixel) in the image between frame images adjacent to each other or frame images having an interval of one frame or more therebetween. The motion vector is also referred to as a local motion.

Further, the term 'motion' as used herein is an amount representing the geometrical deformation (geometric deformation) between frame images caused by a relative displacement and the like between the image-pickup apparatus and the object. In other words, it represents a change in the comprehensive appearance of the image, and is also referred to as a 'global motion'.

The classification of motions of the geometric deformation depend on the nature of the relative displacement. The motions of the geometric deformation include translation (horizontal and vertical), scaling, rotation, shear and foreshortening (horizontal and vertical). When the object is a single, rigid body, all of the changes between the images caused by a relative positional change between the image-pickup apparatus and the object correspond to the aforementioned motions. Accordingly, a local motion vector representing the amount of a local displacement generated at each of the portions in the image can be entirely canceled by performing image correction to cancel the motion.

The local motion vector also represents a value that changes with respect to the motion depending on positions. The motion can also be referred to as the value that is acquired by normalizing the motion vector depending on positions.

Means for correcting the images disclosed in Japanese Patent Laid-Open No. 2005-269419 will be described. The means is constituted by roughly four steps.

First, in a first step, as shown in FIG. 2, a plurality of paired motion detection points (feature points) 32 that can be used to detect local motions are located concentrically so as to be located in point symmetry with respect to a center of an image 31. Black circles denote the feature points 32.

Next, in a second step, the local motion vectors are calculated for each of the feature points 32.

Then, in a third step, as shown in FIG. 3, calculations between the local motion vectors of a certain feature point 82 in an image 81 and those of a feature point 83 that is in point symmetry with the feature point 82 is performed. More specifically, first, between the local motion vectors of the feature points 82 and 83 in circular symmetry with each other, the local motion vector is divided into components oriented in the same directions and in opposite directions. Next, the opposite direction component is divided into a radial direction component and a tangential direction component.

Here, a coordinate change generated by the translation, scaling and rotation is to be expressed as the following expression (1).

$$\begin{bmatrix} x' \\ y' \end{bmatrix} = \begin{bmatrix} a & -b \\ b & a \end{bmatrix} \begin{bmatrix} x \\ y \end{bmatrix} + \begin{bmatrix} c \\ d \end{bmatrix} \quad (1)$$

In this case, the same direction components, that is motion components of the translation (horizontal and vertical), correspond to 'c' and 'd'. Further, the radial direction component of the opposite direction component corresponds to 'a', and the tangential direction component corresponds to 'b'. The opposite direction component is the motion component in which the rotation and scaling are mixed. As described above, parameters 'a', 'b', 'c' and 'd' relating to motions of the translation, scaling and rotation can be acquired from each of the paired feature points in point symmetry.

Parameters 'a', 'b', 'c' and 'd' can be converted into parameters of pure translation, scaling and rotation by simple processing. These motions are referred to as local motions (information) since they are calculated from the local motion vectors.

However, sets of the parameters corresponding to the plurality of paired feature points acquired as described above have variation due to the influences of errors, discretization and matching accuracy.

In a fourth step, for each of the parameters 'a', 'b', 'c' and 'd', each being plurally obtained and respectively relating to the local motions of the translation, scaling and rotation, one set of representative parameters 'A', 'B', 'C' and 'D', each corresponding respectively to a centroid of the variation of the parameters 'a', 'b', 'c' and 'd', is acquired. In this step, as shown in FIGS. 4A and 4B, a processing part performs a convolution on a frequency distribution (histogram) 51 of the parameters with a Gaussian function 53 and, as a representative value, selects a parameter that has the largest integrated value among a frequency distribution 52 on which the convolution has been performed. By the processing described above, the parameters 'A', 'B', 'C' and 'D' of the representative motions relating to the translation, scaling and rotation can be acquired.

By this method, translation in the horizontal and vertical directions, scaling and rotation between the frame images of the moving image can be readily calculated by a simple calculation for each of the plurality of paired local motion vectors.

Moreover, even when an error vector (also referred to as an outlier) is included, since the plurality of motions have been acquired, it is also possible to calculate the motion representing a whole image in which the impact of the error vector is eliminated by simple processing using the histogram. Acquiring the motion information by the aforementioned methods can realize robust processing with a small burden on the apparatus.

Meanwhile, in addition to the motions of the translation, scaling and rotation, information on the geometric deformation, such as the foreshortening between the images, may be required. The foreshortening corresponds to, among the geometric deformations generated by the relative motions between the image-pickup apparatus and the object, a change dominantly generated when a visual axis is inclined. In other words, the foreshortening is a change in which the translation, scaling, rotation and shear are eliminated from a general motion.

FIG. 5B is a diagram showing the geometric deformation (change of an object appearance) and the local motion vectors resulted from the visual axis of the image-pickup apparatus being relatively inclined towards the object in one of the horizontal directions.

Further, when the visual axis is inclined in another direction, the geometric deformation in line symmetry and the local motion vectors are generated. When the visual axis is shifted in the vertical direction, the foreshortening is dominantly generated.

Moreover, as another method for acquiring the motion between the images, Multiple View Geometry, R. Hartley, A. Zisserman, Campridge Press (2000) discloses a method of calculating a linear form with a least-square method by inputting the plurality of motion vectors for points corresponding to each other between frame images, and acquiring the motion information between the frame images.

According to this method, the motions of the translation in the horizontal and vertical directions, scaling, rotation and shear, further, foreshortening between the frame images can be calculated. However, when the error vector is included, without introducing a robust calculation method that places a troublesome and large burden on the apparatus represented by RANSAC, LMedS and the like, motion information representing the whole image that is free from the influence of the error vector cannot be calculated.

In the method disclosed in Japanese Patent Laid-Open No. 2005-269419, motions capable of being modeled are limited to the translation, scaling and rotation among motions between the image-pickup apparatus and the object. Thus, this method cannot handle a case where an unexpected motion generated when a large motion such as foreshortening occurs is included.

On the other hand, the method disclosed in Multiple View Geometry, R. Hartley, A. Zisserman, Campridge Press (2000) is suitable for being used in a case under laboratory-like conditions, such as a case where a plane check board is used as an object, the laboratory-like conditions hardly generating an error of the local motion vector (error vector). That is, the method can model all of the geometric deformation between the frame images that can be caused by any motions between the image-pickup apparatus and the object. However, in such a case of actual circumstances including error vectors among the plurality of motion vectors detected between the frame images, the robust calculation method must be introduced for eliminating the influence of the error vectors.

BRIEF SUMMARY OF THE INVENTION

The present invention provides an image processing apparatus and an image processing method capable of handling more motions and acquiring information representing geometric deformation between images by simple processing.

An image processing apparatus as one aspect of the present invention includes a first processing part selecting motion detection points for detecting a motion between images, and acquiring first motion vectors that are local motion vectors at the motion detection points, a second processing part acquiring first representative motions that are representative motions of translation, scaling and rotation based on the first motion vectors, a third processing part eliminating components of the first representative motions from the first motion vectors and acquiring second motion vectors, a fourth processing part acquiring local foreshortening motions at the motion detection points from the second motion vectors, and a fifth processing part acquiring a second representative motion that is a representative foreshortening motion from the local foreshortening motions.

An image pickup apparatus including the image processing apparatus also provides another aspect of the present invention.

An image processing method as still another aspect of the present invention includes a first step of selecting motion detection points for detecting a motion between images, and acquiring first motion vectors that are local motion vectors at the motion detection points, a second step of acquiring first representative motions that are representative motions of translation, scaling and rotation based on the first motion vectors, a third step of eliminating components of the first representative motions from the first motion vectors and acquiring second motion vectors, a fourth step of acquiring local foreshortening motions at the motion detection points from the second motion vectors, and a fifth step of acquiring a second representative motion that is a representative foreshortening motion from the local foreshortening motions.

Further, a computer-readable recording medium in which a computer program for causing a computer to execute the above-described image processing method is recorded provides yet still another aspect of the present invention.

Other aspects of the present invention will be apparent from the embodiments described below with reference to the drawings.

DETAILED DESCRIPTION OF THE PREFERRED EMBODIMENTS

Exemplary embodiments of the present invention will be described below with reference to the accompanied drawings.

Embodiment 1

Figure 7:
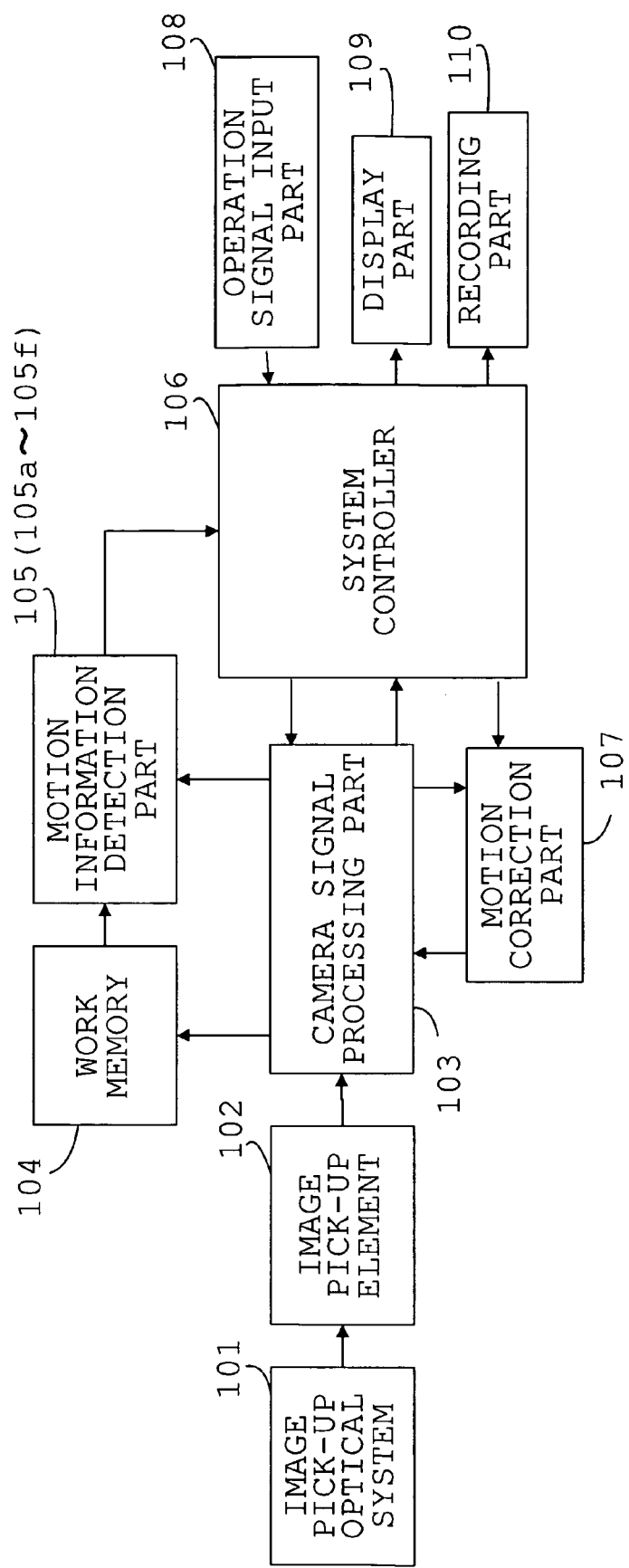
FIG. 7 is a block diagram showing the configuration of an image-pickup apparatus that is Embodiment 1 of the present invention.

FIG. 7 shows the configuration of an image-pickup apparatus such as a video camera, a digital still camera and the like capable of capturing a moving image, which is an embodiment of the present invention.

In FIG. 7, reference numeral 101 denotes an image-pickup optical system, and reference numeral 102 denotes an image-pickup element for photoelectrically converting an object image formed by the image-pickup optical system 101.

Reference numeral 103 denotes a camera-signal-processing part processing a signal from the image-pickup element 102. The camera-signal-processing part 103 performs processing of color difference/luminance separation, sharpening, white balance adjustment, black level adjustment, encoding/decoding and the like of the signal from the image-pickup element 102 so as to generate a moving image constituted by frame images. The image-pickup system is constituted by the image-pickup element 102 and the camera-signal-processing part 103.

Reference numeral 104 denotes a work memory. The work memory 104 stores the frame image for a motion calculation that will be described later.

Reference numeral 105 denotes a motion-information-detection part including a first to a sixth processing parts 105a to 105f. The motion-information-detection part 105 calculates motion information between the frame image stored in the work memory 104 and a current frame image. The motion-information-detection part 105 serves as an image processing apparatus.

The first processing part 105a selects motion detection points for detecting a motion between the frame images to acquire first motion vectors that are local motion vectors at the motion detection points. The second processing part 105b acquires first representative motions that are representative motions of translation, scaling, and rotation based on the first motion vectors. The third processing part 105c eliminates components of the first representative motions from the first motion vectors to acquire second motion vectors. The fourth processing part 105d acquires local motions by foreshortening (local foreshortening motions) from the second motion vectors. The fifth processing part 105e acquires a second representative motion that is a representative foreshortening motion from the local foreshortening motions. Further, the sixth processing part 105f synthesizes the first and second representative motions.

The first to the sixth processing parts 105a to 105f are not provided independently from each other, but are constituted integrally with each other by a microcomputer including the motion-information-detection part 105 and an image processing program that will be described later.

Reference numeral 106 denotes a system controller constituted by the microcomputer that comprehensively controls the whole image pickup apparatus.

Reference numeral 107 denotes a motion correction part, where electronic image stabilization processing is performed based on the motion information between the frame images acquired by the motion-information-detection part 105. More specifically, an area of the frame image to be clipped from the image generated by the image-pickup element 102 using all effective pixels is shifted based on the motion information. Thus, a moving image with reduced image shaking can be obtained.

Reference numeral 108 denotes an operation-signal-input part inputting an operation signal into the system controller 106 according to an operation performed by various kinds of operation members (not shown). The operation members include a function selecting button, a setting button, an image-pickup starting/ending button. A touch-panel display element may be used as the operation-signal-input part 108 and may be provided integrally with a display part that will be described later.

Reference numeral 109 denotes a display part including a display element such as a liquid crystal display. The display part 109 displays the captured moving image and a setting state of various operation modes.

Reference numeral 110 denotes a recording part that records image data in a recording medium such as a semiconductor memory, an optical disk and magnetic tape.

Next, with reference to FIG. 1, processing for calculating geometric deformation between the frame images in the motion-information-detection part 105 will be described. The motion-information-detection part 105 as the microcomputer performs the processing according to a computer program (image processing program) stored therein. A flowchart of FIG. 1 also shows a method of processing the image.

At step S101, whether or not the execution of the processing is instructed (ON) is checked. When it is OFF, the processing is ended. When it is ON, the process proceeds to step S102.

At step S102, the local motion vectors (first motion vectors) between two frame images (hereinafter referred to as motion detection images) that are adjacent to each other or have an interval of one frame or more therebetween are calculated. In this embodiment, of the two frame images that are the motion detection images, one of them is defined as a reference image and the other is defined as a search image to perform block-matching.

Figure 2:
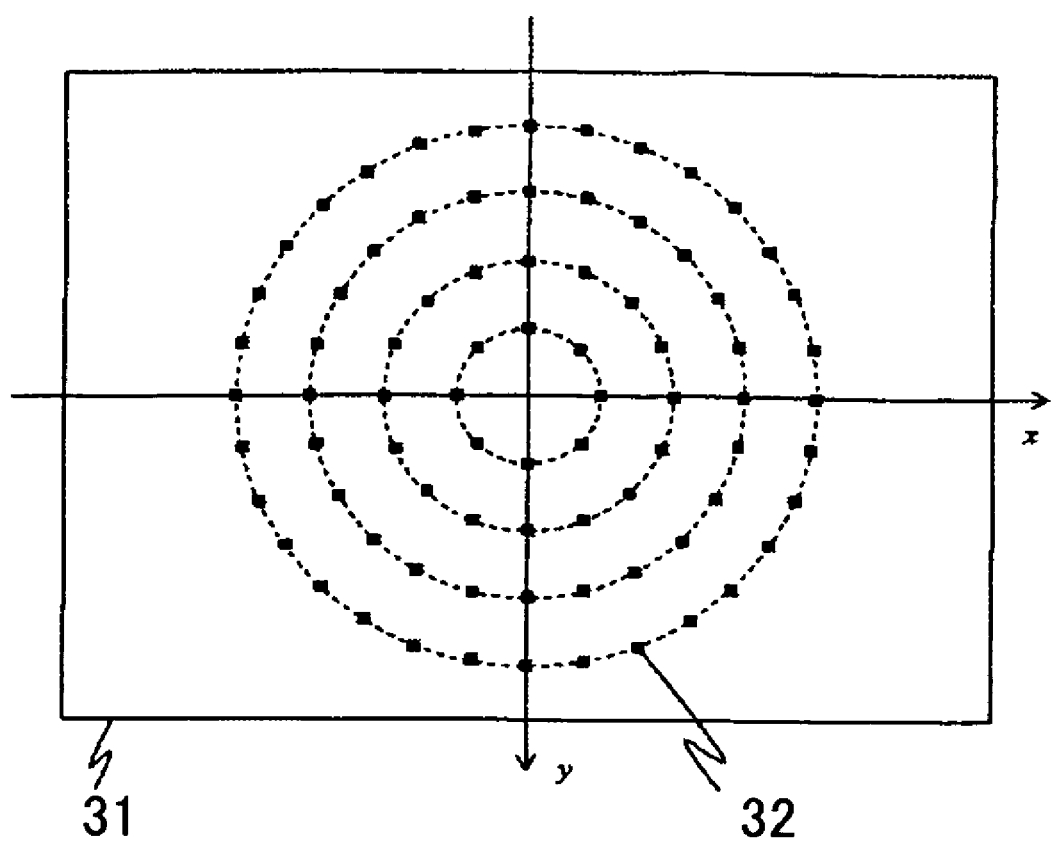
FIG. 2 is a diagram showing a location of feature points in the embodiment.

More specifically, as shown in FIG. 2, a plurality of paired feature points (motion detection points) 32 are selected such that in the reference image 31 each of the paired feature points is located in point symmetry with respect to a center of the reference image 31. The plurality of paired feature points 32 are located concentrically (in circular symmetry) with respect to the center of the reference image 31.

Figure 8:
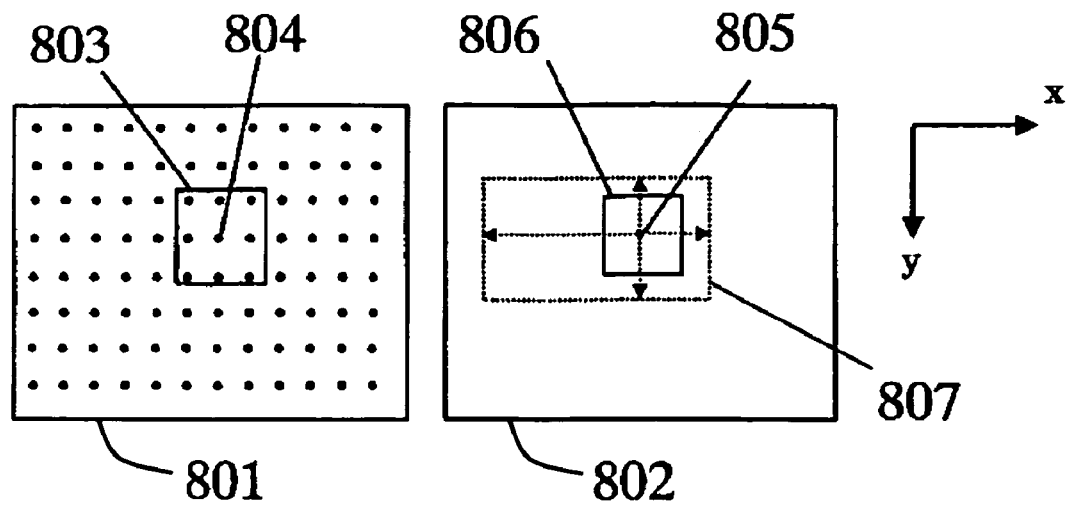
FIG. 8 is a diagram illustrating block-matching performed in the embodiment.

FIG. 8 shows an example of the block-matching. An image 801 at the left in the diagram is the reference image, and an image 802 at the right is the search image. In the diagram, although the plurality of feature points 804 are located in a grid pattern in the reference image 801, they are actually located concentrically as shown in FIG. 2.

For the block-matching operation, a partial region of a specified size whose center is an arbitrary feature point (attention pixel) 804 located in the reference image 801 is defined as a template 803. Then, while a candidate region 806 is sequentially moved in a search region 807 arbitrarily set in the search image 802, a position of the candidate region matching most with the template 803 is searched.

More specifically, a degree of similarity between the template 803 in the reference image 801 and the candidate region 806 including a pixel 805 as a reference therein corresponding to the feature point 804 in the search image 802 is calculated. SSD (Sum of Square Difference), SAD (Sum of Absolute Difference) and NNC (Normalized Cross Correlation) and the like are employed as an indication of the degree of the similarity.

Among the overall calculation results for the degree of the similarity for the candidate region 806, a position having the highest degree of the similarity is regarded as a corresponding position, and the local motion vector showing the motion from the feature point 804 to the corresponding pixel 805 is calculated. If there is no occlusion, as many local motion vectors as there are feature points 804 set on the reference image 801 are calculated. That is, the plurality of feature points 804 are defined, and then the plurality of local motion vectors are calculated.

Next, at step S103, the representative motions (first representative motions) of the translation, scaling and rotation between the motion detection images are calculated.

Figure 3:
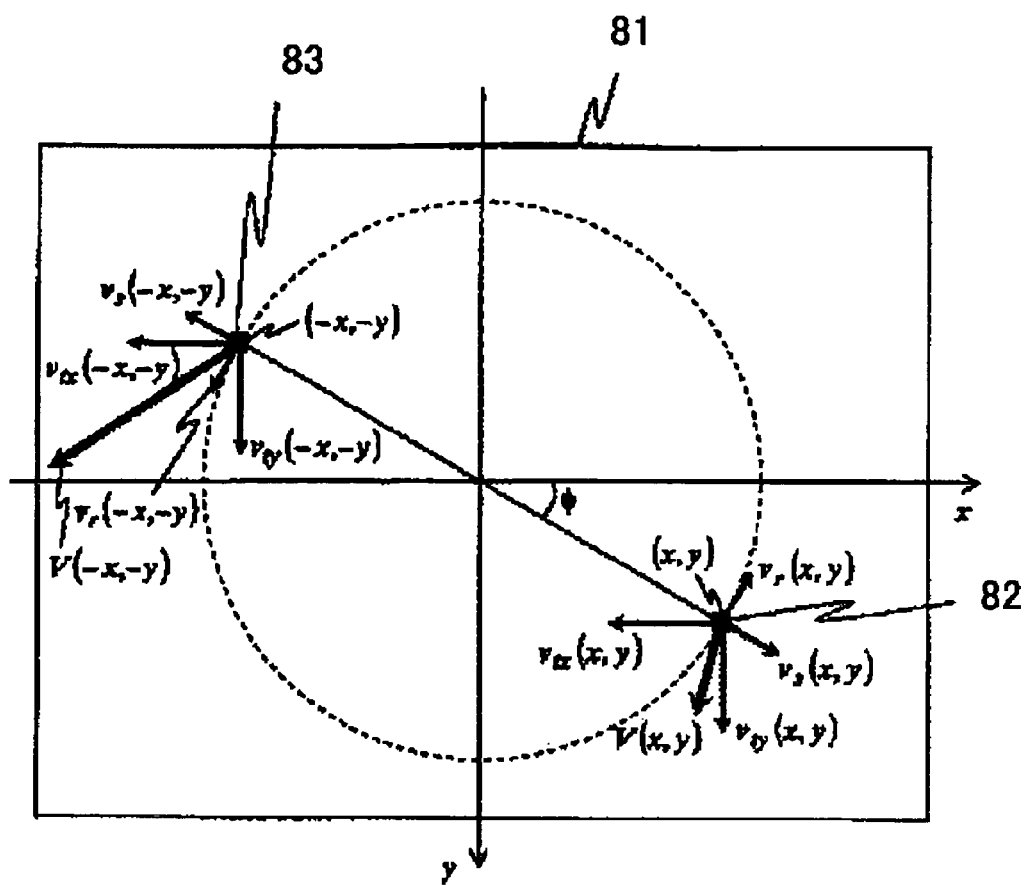
FIG. 3 is a diagram illustrating calculations between local motion vectors in the embodiment.

As described in 'BACKGROUND OF THE INVENTION', first, the local motion vectors at the feature points 82 and 83 located in circular symmetry (point symmetry) as shown in FIG. 3 are divided into components of the same direction (hereinafter referred to as same direction components) and components of opposite directions (hereinafter referred to as opposite direction components).

Figure 9:
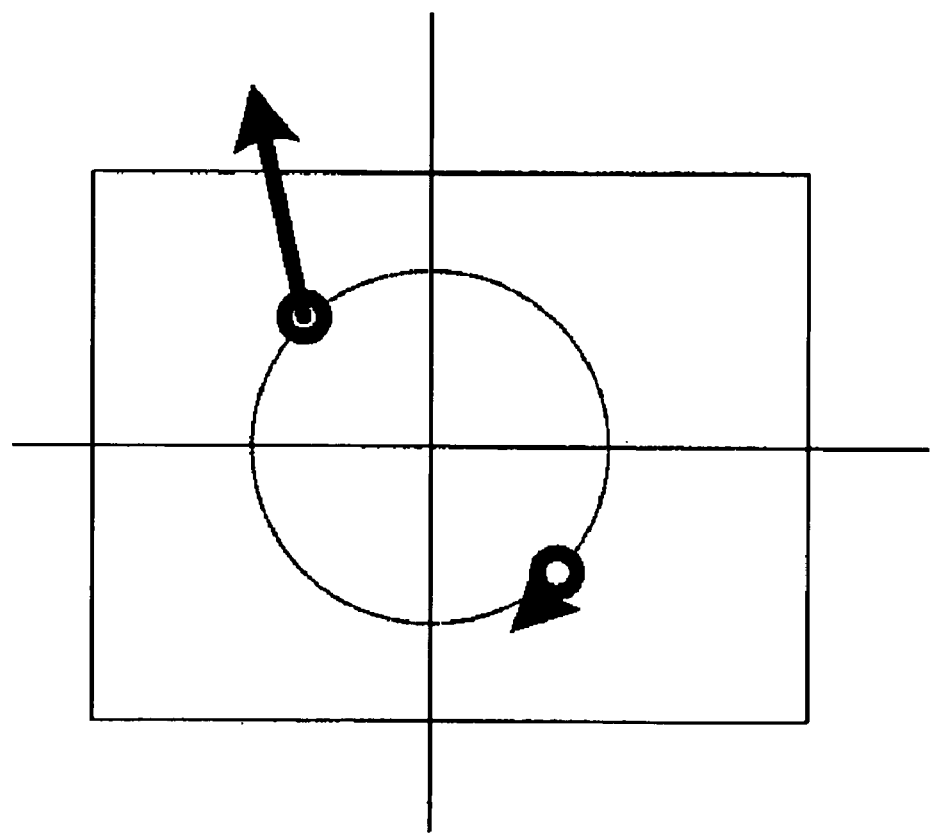
FIG. 9 is a diagram showing motion detection points and local motion vectors in the embodiment.

In FIG. 9, among the plurality of feature points for which the local motion vectors are calculated at step S102, arbitrarily paired feature points (shown by bold circles) located in point symmetry and the local motion vectors (shown by bold arrows) calculated for the feature points are shown. Further, FIGS. 10A to 10D show the local motions by the translation, scaling and rotation at the paired feature points.

Figure 10A:
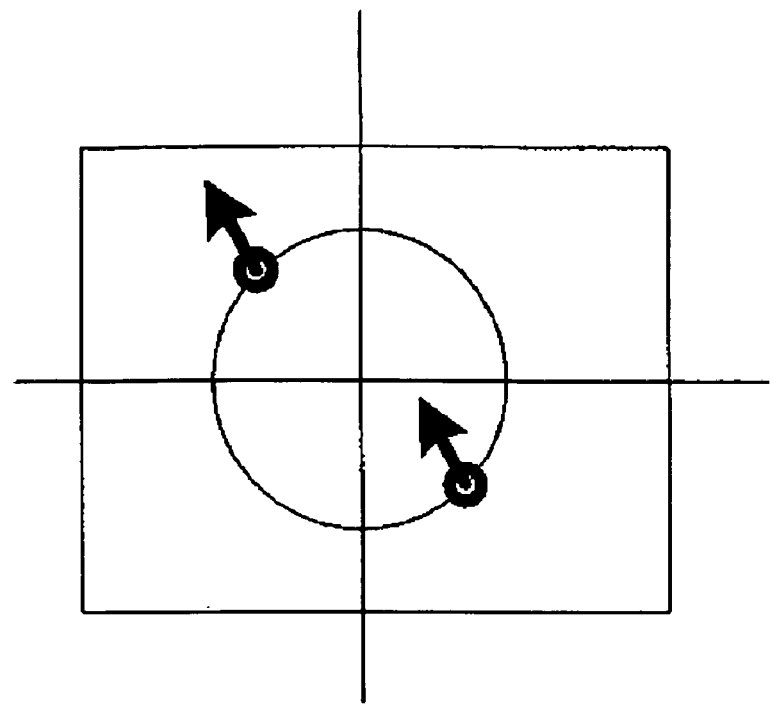
FIG. 10A is a diagram showing a local motion by translation in the embodiment.
Figure 10B:
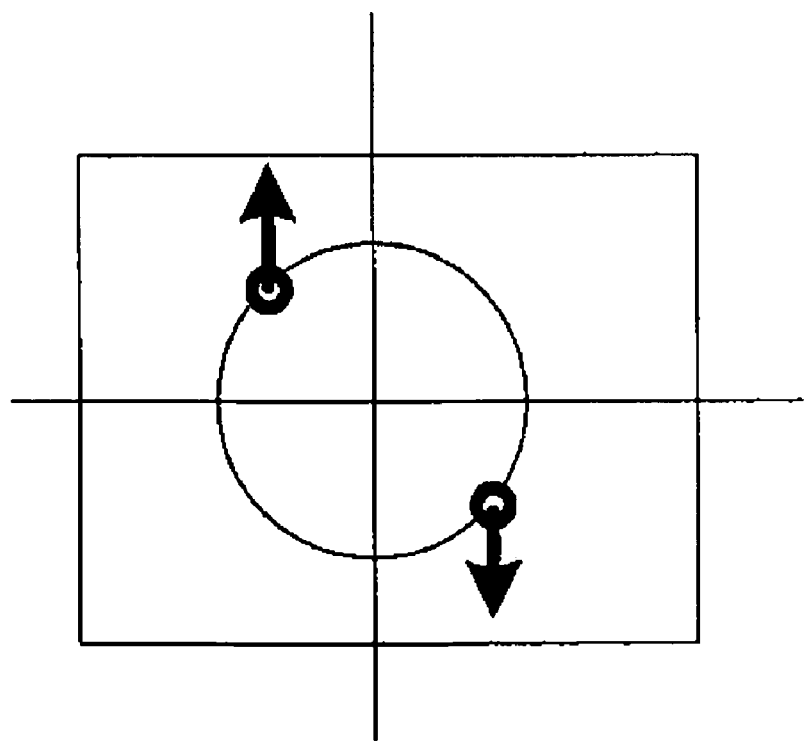
FIG. 10B is a diagram showing a local motion made by mixed scaling and rotation in the embodiment.

The local motion vectors at the paired feature points described above are divided into the same direction components and the opposite direction components by a subtracting calculation and an adding calculation. FIG. 10A shows the same direction components extracted from the local motion vectors shown in FIG. 9. FIG. 10B shows the opposite direction components extracted from the local motion vectors shown in FIG. 9.

Figure 10C:
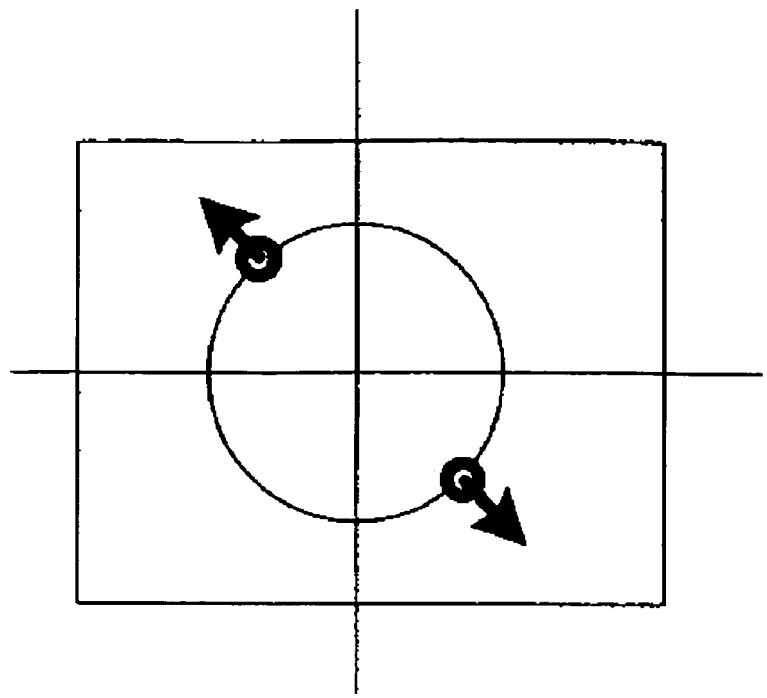
FIG. 10C is a diagram showing a local motion by the scaling in the embodiment.
Figure 10D:
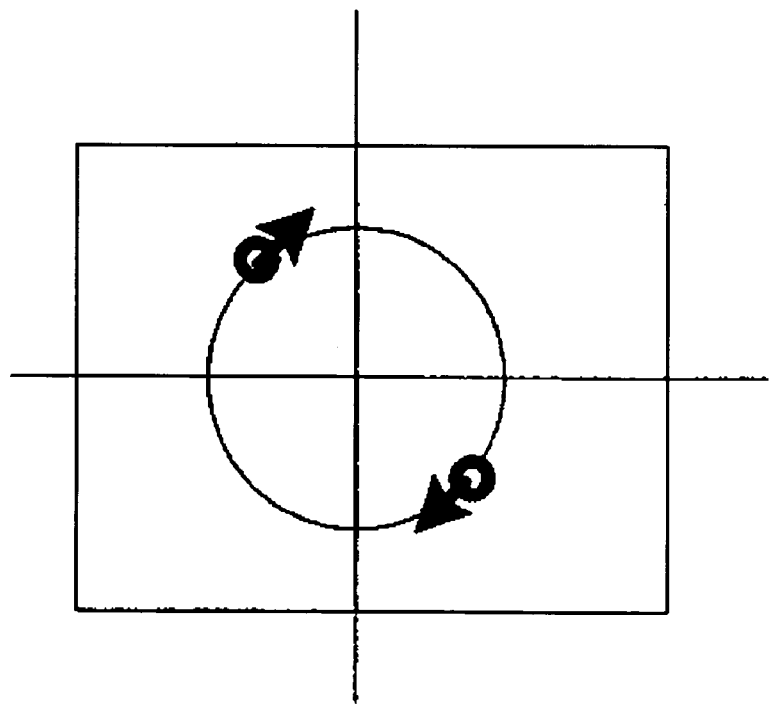
FIG. 10D is a diagram showing a local motion by the rotation in the embodiment.

Next, the opposite direction components shown in FIG. 10B are further divided into components extending in a radial direction (hereinafter referred to as radial direction components) with respect to the center of the image and components in a tangential direction orthogonal to the radial direction (hereinafter referred to as tangential direction components). FIG. 10C shows the radial direction components, and FIG. 10D shows the tangential direction components.

These simple processing operations described above calculate parameters 'a', 'b', 'c' and 'd' respectively representing the local motions of the translation, scaling (enlarging and reducing) and rotation at the paired feature points located in point symmetry described above. The parameters 'a', 'b', 'c' and 'd' are the parameters in the expression (1) described above.

Figure 11:
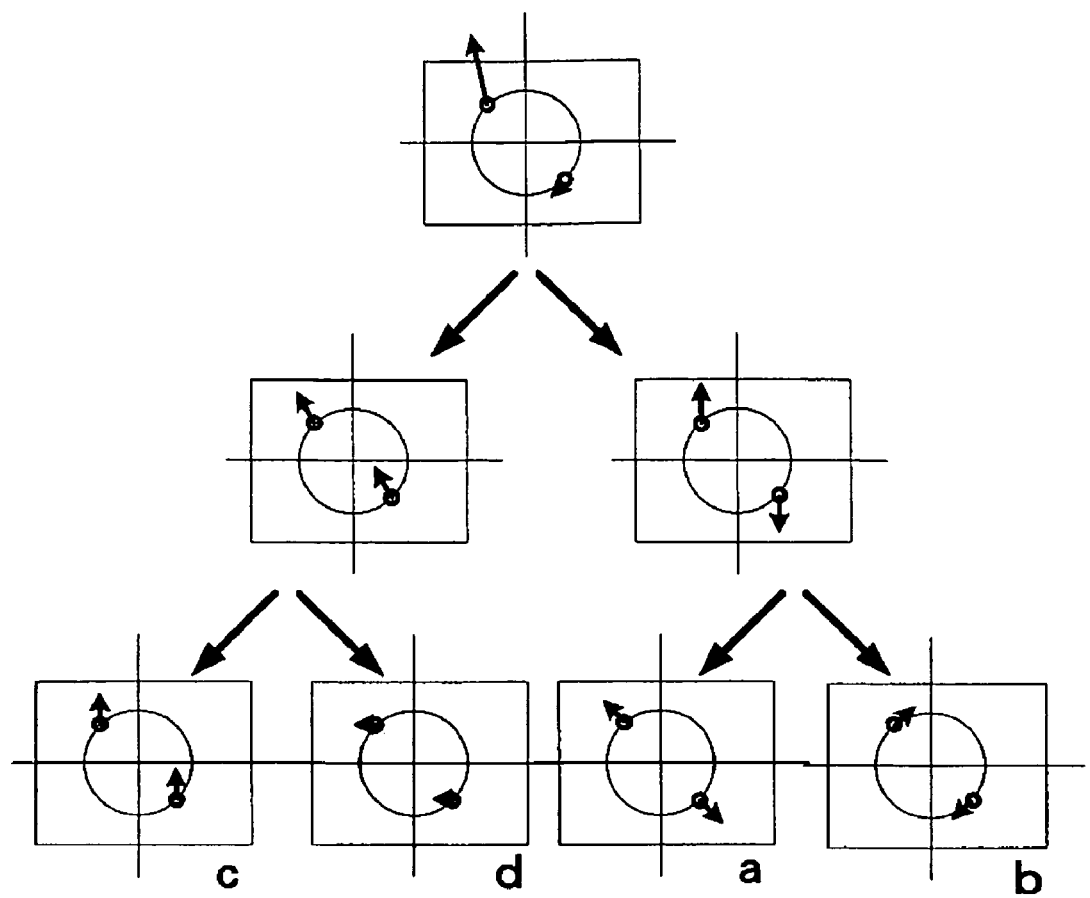
FIG. 11 is a diagram comprehensively showing processes for calculating the local motions of the translation, scaling and rotation from the local motion vectors shown in FIG. 9.

FIG. 11 comprehensively shows a process of calculations of the local motions of the translation, scaling and rotation from the local motion vectors shown in FIG. 9.

At a top row in FIG. 11, the same diagram as that in FIG. 9 is shown. At a middle row in FIG. 11, the same diagrams as those in FIGS. 10A and 10B are shown. At a bottom row in FIG. 11, 'a' corresponds to the radial direction components shown in FIG. 10C and 'b' corresponds to the tangential direction components shown in FIG. 10D. The radial direction components and the tangential direction components are the motion components of the scaling and rotation, respectively. The parameters 'c' and 'd' respectively correspond to the motion components of the translation in vertical and horizontal directions that are divided from the same direction component shown in FIG. 10A.

Next, a centroid of variation of each of the parameters 'a', 'b', 'c' and 'd' relating to the translation, scaling and rotation that are obtained for each of the plurality of paired feature points is acquired. The centroid of the variation for each of the parameters 'a', 'b', 'c' and 'd' is the parameter corresponding to a most frequent position in a frequency distribution (histogram) of each parameter. Thus, parameters 'a', 'b', 'c' and 'd' corresponding to the most frequent positions are respectively acquired as parameters 'A', 'B', 'C' and 'D' representing the representative motions (first representative motions) of the translation, scaling and rotation.

Figure 4A:
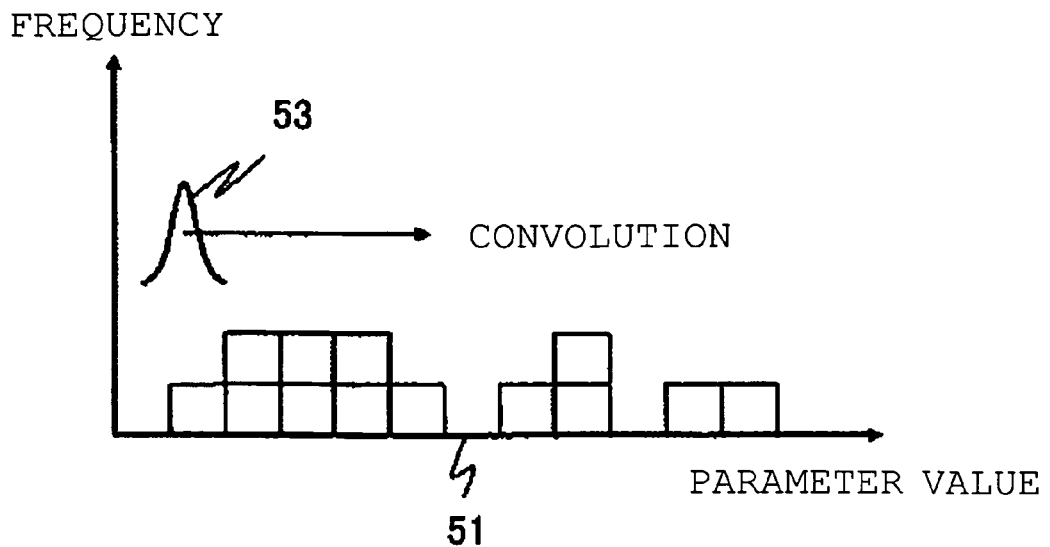
FIGS. 4A and 4B are diagrams illustrating an extraction of a representative value using a convolution on a histogram.
Figure 4B:
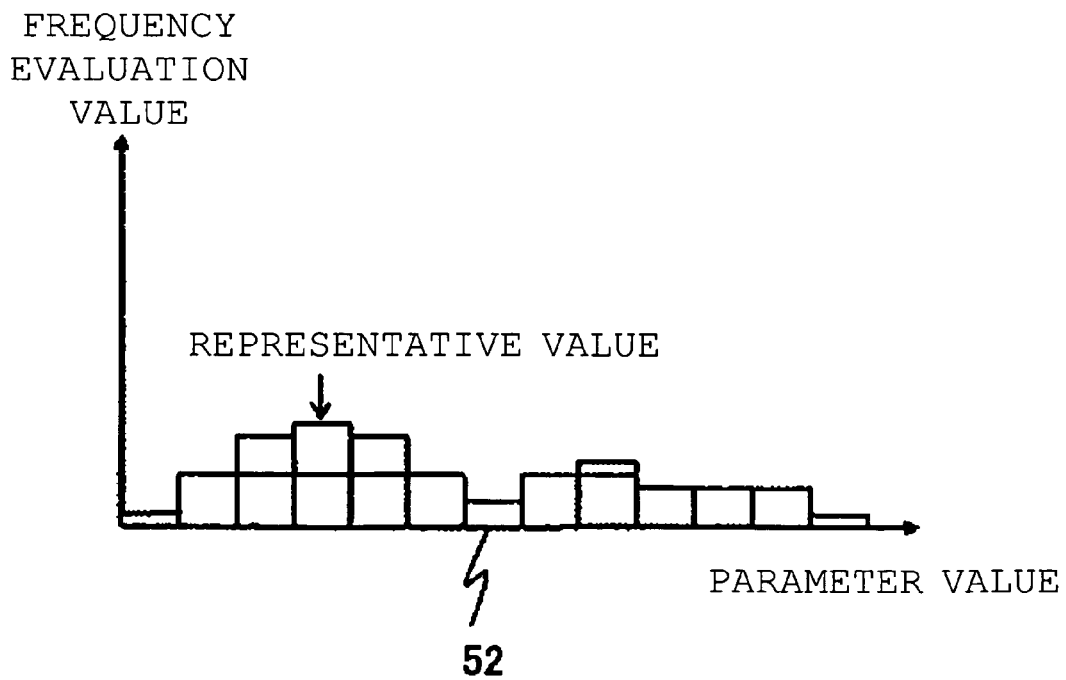

Here, as shown in FIGS. 4A and 4B, a convolution is performed on the histogram with a Gaussian function to select parameters having the largest integration values as the representative motion parameters 'A', 'B', 'C' and 'D'. The Gaussian function is the function having a single peak and broadening therefrom. The convolution may also be performed with a function having the single peak and a broadening other than the Gaussian function. The representative motion represents an amount of the geometric deformation expressed with the parameter 'A', 'B', 'C' or 'D'.

At step S104, the representative motion components of the translation, scaling and rotation are eliminated from the respective local motion vectors at the feature points. Here, the local motion vector acquired at step S102 is expressed as [x, y, 1]. Then, a reverse conversion is performed on the local motion vector [x, y, 1] so that the representative motions of the translation, scaling and rotation that have been calculated at step S103 are canceled. More specifically, an inverse matrix [expression (2)] will be applied shown as follows:

$$H_s = \begin{bmatrix} a & -b & c \\ b & a & d \\ 0 & 0 & 1 \end{bmatrix} \quad (2)$$

Figure 12A:
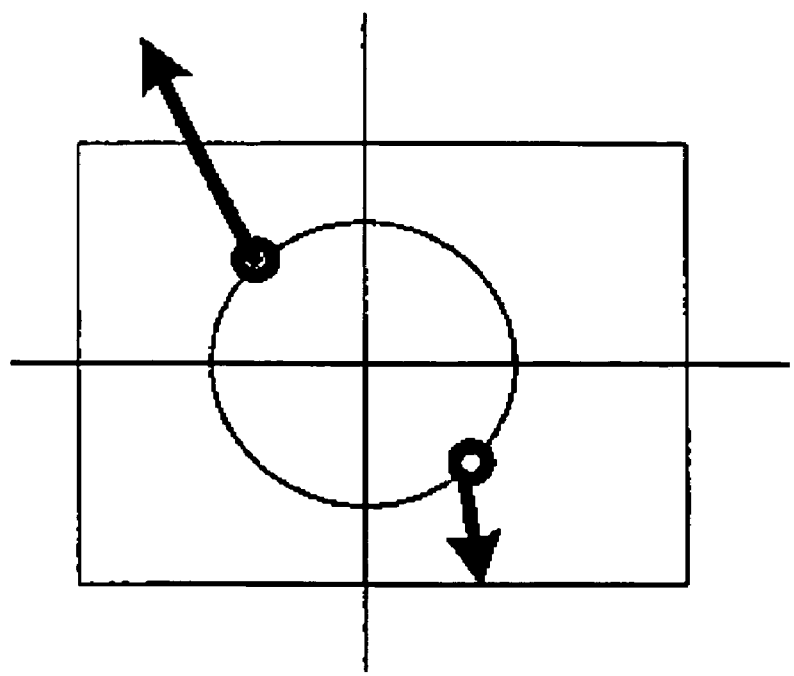
FIG. 12A is a diagram showing the local motion vectors at the same motion detection points as those in FIG. 9.
Figure 12B:
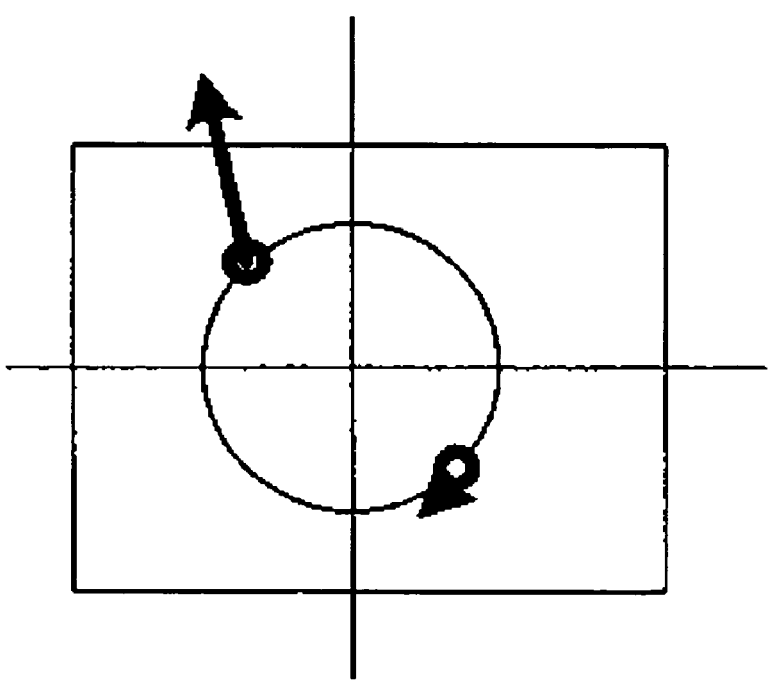
FIG. 12B is a diagram showing local motion vectors acquired by reconverting representative motions of the translation, scaling and rotation acquired from the local motion vectors shown in FIG. 12A.
Figure 12C:
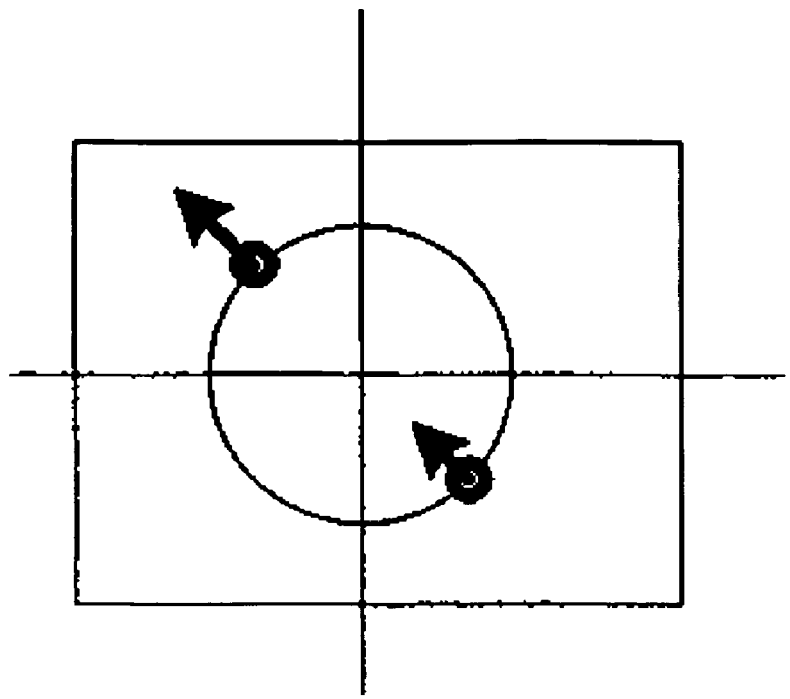
FIG. 12C is a diagram showing local motion vectors by the foreshortening and shear, which are acquired by eliminating the local motion vectors (representative motions) shown in FIG. 12B from the local motion vectors shown in FIG. 12A.

FIGS. 12A to 12C show a process of eliminating the representative motions. FIG. 12A shows the local motion vectors at the two feature points located in point symmetry, the local motion vectors having been acquired at step S102. FIG. 12B shows the local motion vectors at the feature points shown in FIG. 12A that are acquired by reconverting the representative motions of the translation, scaling and rotation acquired from the local motion vectors at step S103.

FIG. 12C shows the local motion vectors (second motion vectors) exhibiting foreshortening and shear that can be acquired by eliminating the local motion vectors corresponding to the representative motions shown in FIG. 12B from the local motion vectors shown in FIG. 12A in the process of eliminating the representative motions.

At step S105, the local foreshortening motion is calculated from the local motion vector in which the components of the representative motions of the translation, scaling and rotation have been eliminated at step S104.

Figure 5A:
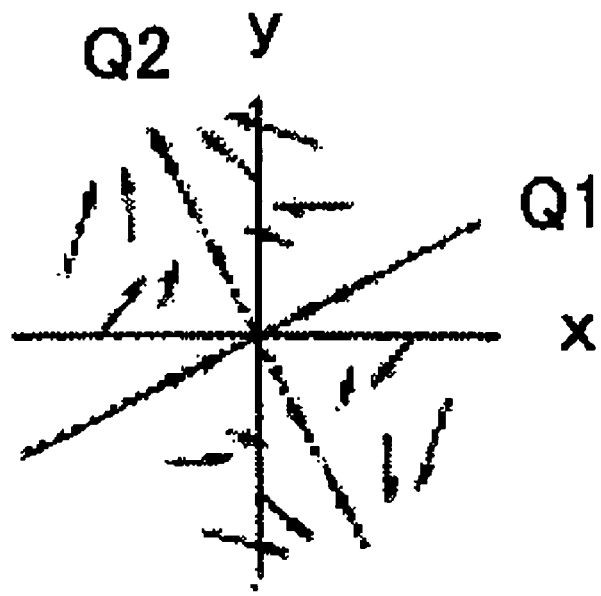
FIG. 5A is a diagram showing a shear motion.
Figure 5B:
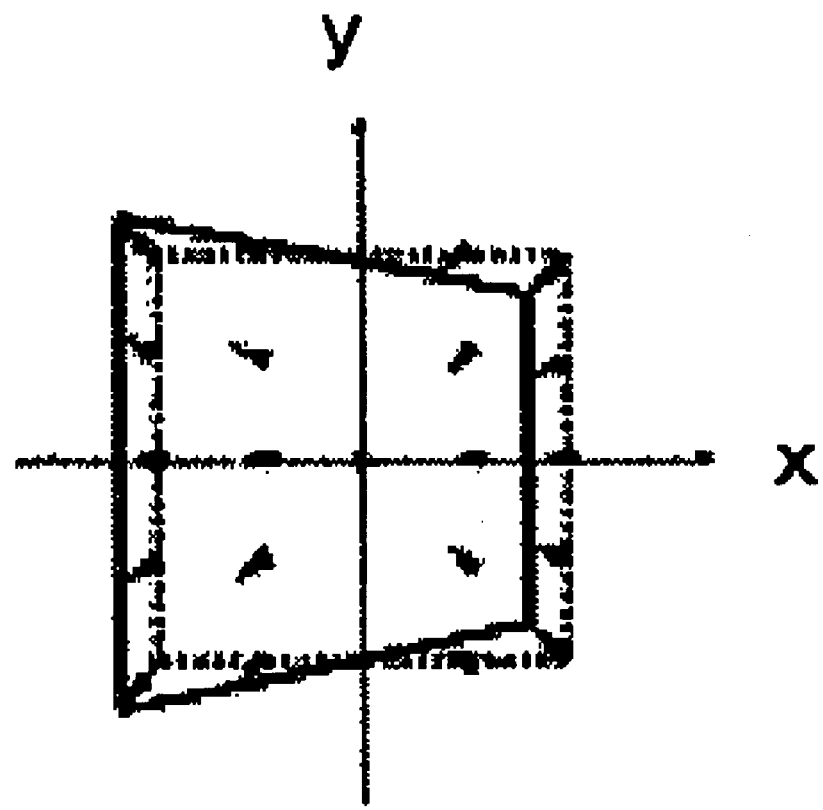
FIG. 5B is a diagram showing a foreshortening motion.

When the representative motion components of the translation, scaling and rotation are eliminated, the shear shown in FIG. 5A and the foreshortening shown in FIG. 5B can be generated on an image exhibiting motions of a plane in space.

The shear is a motion of the image generated in relation to a direction of an object, when the image-pickup apparatus is moved widely in the vertical direction with respect to an optical axis of the image-pickup optical system. However, motion information on the shear is not necessary when information on the geometric deformation of the image is used for image stabilization, so that it is not estimated in this embodiment.

Figure 6:
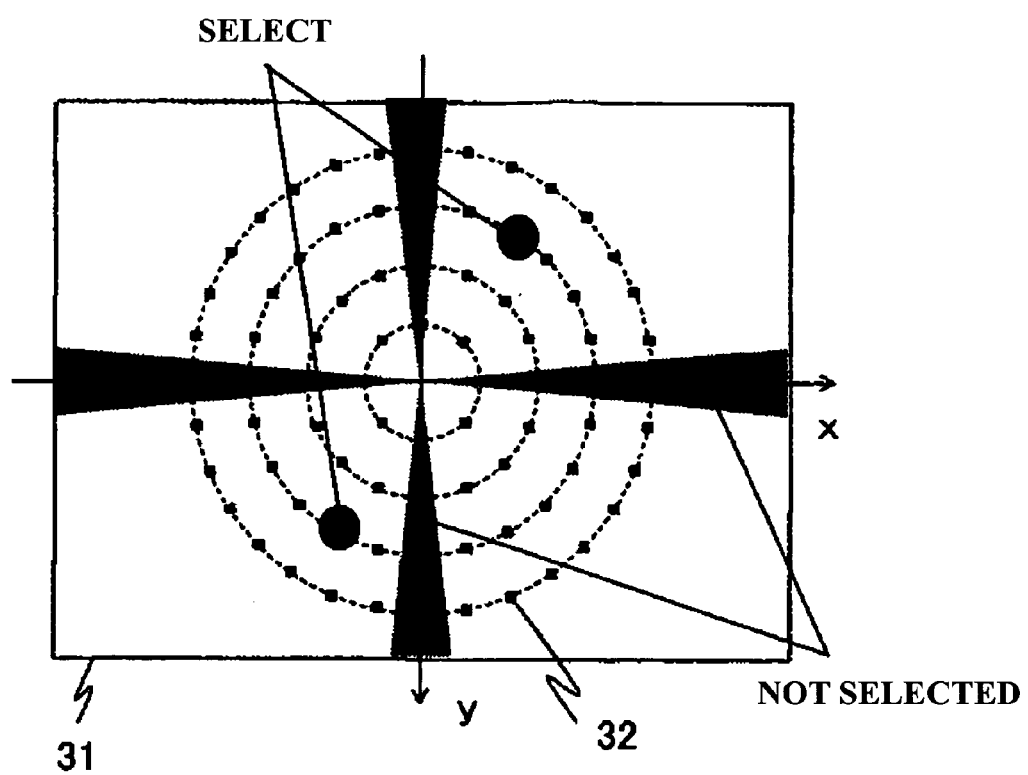
FIG. 6 is a diagram illustrating a method of calculating a local foreshortening motion amount in the embodiment.

However, local-foreshortening-motion information is handled as error information. As shown in FIG. 6, the local foreshortening motion is estimated using the local motion vectors that have been acquired by eliminating the representative motions of the translation, scaling and rotation at two feature points 32 (shown by 'Select' in the figure) located in circular symmetry that have been used for acquiring the translation, scaling and rotation. For the estimation, the local motion vectors at feature points (shown by 'Not Selected') in shaded regions each having a triangle shape in the image 31 shown in FIG. 6 are not used, the shaded region including a horizontal axis (X axis) and a vertical axis (Y axis) and the vicinity thereof.

In this case, the local motion vector in which the representative motion components of the translation, scaling and rotation are eliminated may include only the foreshortening motion. Since the foreshortening motion cannot be calculated by vector calculation unlike the translation, scaling and rotation, it is algebraically calculated. The following expression (3) is an algebra expression showing the geometric deformation when only a motion corresponding to the foreshortening is generated at a certain coordinate point. In the expression (3), 'g' and 'h' are parameters relating to the foreshortening motion.

$$\begin{bmatrix} x' \\ y' \\ m \end{bmatrix} = \begin{bmatrix} 1 & 0 & 0 \\ 0 & 1 & 0 \\ g & h & 1 \end{bmatrix} \begin{bmatrix} x \\ y \\ 1 \end{bmatrix} \quad (3)$$

This expression can be changed as follows:

$$\begin{bmatrix} xx' & yx' \\ xy' & yy' \end{bmatrix} \begin{bmatrix} g \\ h \end{bmatrix} = \begin{bmatrix} x - x' \\ y - y' \end{bmatrix} \quad (4)$$

Here, when x' and y' in the expression (4) are expressed as x'=x+dx, y'=y+dy, the expression (4) can be changed into an expression form of the coordinates and the motion vector at the feature point as follows:

$$\begin{bmatrix} x(x+dx) & y(x+dx) \\ x(y+dy) & y(y+dy) \end{bmatrix} \begin{bmatrix} g \\ h \end{bmatrix} = \begin{bmatrix} -dx \\ -dy \end{bmatrix} \quad (5)$$

When this expression is applied to two feature points, the following expressions (four expressions) are satisfied:

$$\begin{bmatrix} x_1(x_1+dx_1) & y_1(x_1+dx_1) \\ x_1(y_1+dy_1) & y_1(y_1+dy_1) \\ x_2(x_2+dx_2) & y_2(x_2+dx_2) \\ x_2(y_2+dy_2) & y_2(y_2+dy_2) \end{bmatrix} \begin{bmatrix} g \\ h \end{bmatrix} = \begin{bmatrix} -dx_1 \\ -dy_1 \\ -dx_2 \\ -dy_2 \end{bmatrix} \quad (6)$$

Next, a pseudo inverse matrix or a generalized inverse matrix of the first term on the left-hand side of the expression (6) is acquired, and then the acquired matrix is multiplied by the right-hand side to acquire [g, h].

This process can calculate the amount of the local foreshortening motion for each of the paired feature points. The foreshortening amount is one of the motion amounts estimated from the two local points, so that it is referred to as the local foreshortening motion amount.

As shown in FIG. 6, since there are many (countless) paired points located in point symmetry on an identical circumference and concentric circles, the local foreshortening motion amount is also calculated for the plurality of two paired points.

Although the local foreshortening motion amount is calculated from the local motion vectors at one of the plurality of two paired points in this embodiment, the local foreshortening motion amount may be calculated by the least square method using the local motion vectors at the plurality of two paired points.

At step S106, the representative foreshortening motion is calculated using the histogram from the plurality of calculated local foreshortening motions.

In this case also, a local foreshortening motion corresponding to the centroid of the variation (the most frequent position of the frequency distribution) of the local foreshortening motions calculated at the plurality of paired two points is extracted as a representative value. This representative value is referred to as the representative foreshortening motion (second representative motion).

At step S107, the representative motions of the translation, scaling and rotation acquired at step S103 and the representative motion of the foreshortening acquired at step S106 are synthesized to be converted into a form that can be easily handled. More specifically, the synthesized result is geometrically converted using the following expressions (7) to (9).

A variation of the image due to a motion of a plane in space is analyzed into components as shown below. $H_s$ represents the components of the translation (t), scaling (s) and rotation (r), $H_a$ represents the component of the shear, and $H_p$ represents the component of the foreshortening.

$$H = H_s H_a H_p = \begin{bmatrix} sR & \vec{t} \\ 0^T & 1 \end{bmatrix} \begin{bmatrix} K & 0 \\ 0^T & 1 \end{bmatrix} \begin{bmatrix} I & 0^T \\ v^T & v \end{bmatrix} \quad (7)$$

With 'a', 'b', 'c' and 'd' acquired at step S103, the expression (7) is changed as follows:

$$H_s = \begin{bmatrix} a & -b & c \\ b & a & d \\ 0 & 0 & 1 \end{bmatrix} \quad (8)$$

$$H_a = I$$

$$H_p = \begin{bmatrix} 1 & 0 & 0 \\ 0 & 0 & 0 \\ g & h & v \end{bmatrix}$$

A synthesized matrix expressed by H=HsHp is acquired from the expression (8). The synthesized matrix does not include the motion component by the shear as expressed by Ha=I.

Then, a homography that is a standard form for expressing the geometric deformation between the images is expressed as follows:

$$H = \begin{bmatrix} h_1 & h_2 & h_3 \\ h_4 & h_5 & h_6 \\ h_7 & h_8 & h_9 \end{bmatrix}. \quad (9)$$

($h_1 \ldots h_9$ are arbitrary numbers).

Thus, the motion information between images including the foreshortening motion information can be obtained in addition to the motion information of the translation, scaling and rotation.

At step S108, whether or not the processing on the next frame image is continued is checked. When continued, the process returns to step S101 to continue the processing.

As described above, according to this embodiment, the information on the geometric deformation between the frame images including not only the motion information on the translation, scaling and rotation but also the motion information on the foreshortening can be obtained by simple processing. Performing the electronic image stabilization processing by using the motion information can generate a moving image in which the motion of the image (image shake) due to the translation, scaling, rotation and foreshortening are reduced.

Embodiment 2

In Embodiment 1 described above, the image pickup apparatus is explained in a case where the motion-information-detection part as the image processing apparatus is built therein. However, the present invention is not limited thereto.

Figure 13:
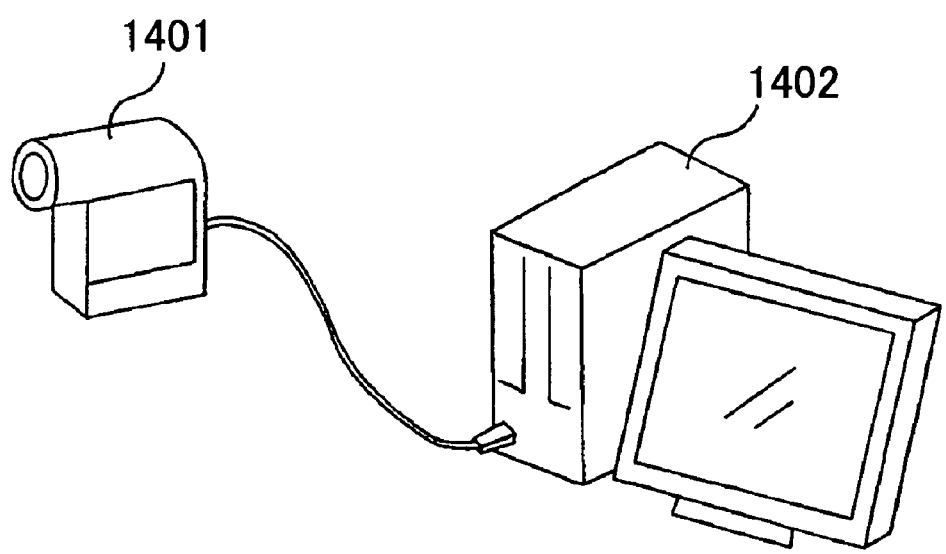
FIG. 13 is a diagram showing the image processing apparatus that is Embodiment 2 of the present invention.

As shown in FIG. 13, for example, the image (frame image) captured by an image-pickup apparatus 1401 is sent to a personal computer 1402. Either a cable connection or a wireless connection, or alternatively, the Internet or a LAN may be used as part of a sending method.

Figure 1:
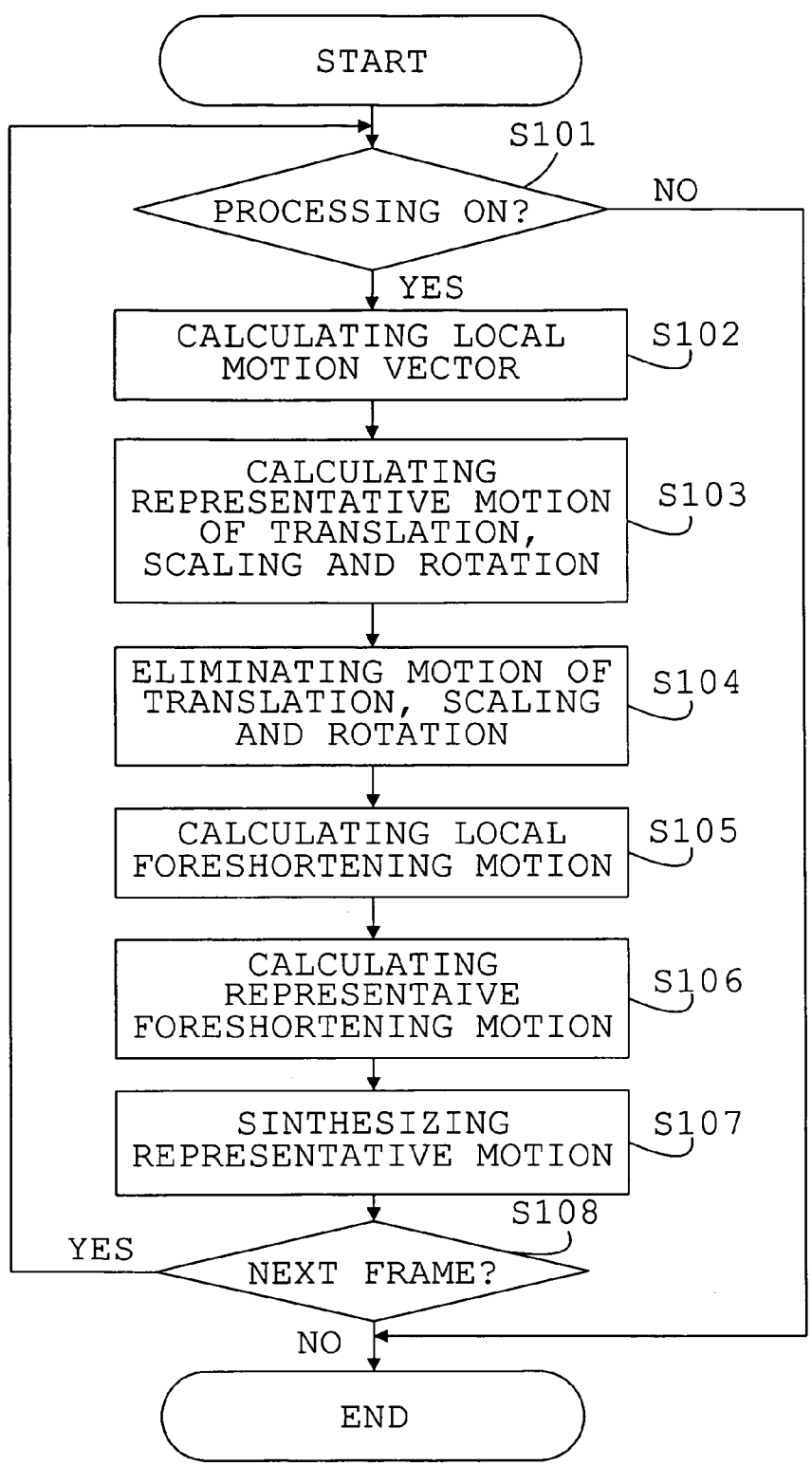
FIG. 1 is a flowchart showing a processing operation in an image processing apparatus (motion-information-detection part) that is an embodiment of the present invention.

The personal computer 1402 may perform the geometric-deformation-calculation processing shown by the flowchart in FIG. 1. In this case, the personal computer 1402 serves as the image processing apparatus.

According to each of the embodiments described above, the information representing the geometric deformation between the images including the translation, scaling, rotation and foreshortening can be generated by simple processing.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

For example, a computer-readable recording medium in which a computer program for causing a computer included in an image-pickup apparatus or a personal computer to execute the above-described image processing method is recorded is included in the present invention.

This application claims foreign priority benefits based on Japanese Patent Application No. 2007-055381, filed on Mar. 6, 2007, which is hereby incorporated by reference herein in its entirety as if fully set forth herein.

What is claimed is:

1. An image processing apparatus comprising:
   an image processing unit configured to obtain a plurality of images;
   a motion information detection unit configured to detect motion information on geometric deformation between the images, wherein the motion information detection unit comprises following five parts,
      a first processing part configured to select motion detection points for detecting a motion between the images, and acquiring first motion vectors that are local motion vectors at the motion detection points,
      a second processing part configured to acquire first representative motions that are representative motions of translation, scaling and rotation based on the first motion vectors,
      a third processing part configured to eliminate components of the first representative motions from the first motion vectors and acquiring second motion vectors,
      a fourth processing part configured to acquire local foreshortening motions at the motion detection points from the second motion vectors,
      a fifth processing part configured to acquire a second representative motion that is a representative foreshortening motion from the local foreshortening motions, and
   a motion correction unit configured to perform electronic image stabilization processing based on the motion information.

2. An image processing apparatus according to claim 1, wherein the first processing part selects the motion detection points that are located point-symmetrically with respect to an image center to acquire the first motion vectors at the motion detection points, and
wherein the second processing part performs a convolution operation on a frequency distribution of local motions of each of the translation, scaling and rotation, the local motions being acquired from the first motion vectors, with a function having a single peak and a broadening portion, and uses local motions at most frequent positions obtained by the respective operation operations as the first representative motions in the third processing part.

3. An image processing apparatus according to claim 1, wherein the third processing part performs a convolution operation on a frequency distribution of the local foreshortening motions at the motion detection points with a function having a single peak and a broadening portion, and uses a local foreshortening motion at a most frequent position obtained by the convolution operation as the second representative motion.

4. An image processing apparatus according to claim 1, wherein the motion information detection unit further comprises a sixth processing part configured to synthesize the first representative motions and the second representative motion.

5. An image processing apparatus according to claim 4, wherein the sixth processing part does not synthesize a shear motion.

6. An image pickup apparatus comprising:
   an image pickup system configured to pick up an object image to generate an image; and
   an image processing apparatus according to claim 1, configured to acquire information on geometric deformation between the generated images, wherein the image processing unit obtains the images from the image pickup system.

7. An image processing method for acquiring information on geometric deformation between images comprising:

a first step of selecting motion detection points for detecting motions between the images, and acquiring first motion vectors that are local motion vectors at the motion detection points;

a second step of acquiring first representative motions that are representative motions of translation, scaling and rotation based on the first motion vectors;

a third step of eliminating components of the first representative motions from the first motion vectors and acquiring second motion vectors;

a fourth step of acquiring local foreshortening motions at the motion detection points from the second motion vectors; and a fifth step of acquiring a second representative motion that is a representative foreshortening motion from the local foreshortening motions.

8. A non-transitory computer-readable recording medium in which a computer program for causing a computer to execute an image processing method according to claim 7 is recorded.

9. An image processing method according to claim 7,
wherein the first step selects the motion detection points that are located point-symmetrically with respect to an image center to acquire the first motion vectors at the motion detection points, and
wherein the second step performs a convolution operation on a frequency distribution of local motions of each of the translation, scaling and rotation, the local motions being acquired from the first motion vectors, with a function having a single peak and a broadening portion, and uses local motions at most frequent positions obtained by the respective convolutions as the first representative motions in the third step.

10. An image processing method according to claim 7, wherein the third step performs a convolution operation on a frequency distribution of the local foreshortening motions at the motion detection points with a function having a single peak and a broadening portion, and uses a local foreshortening motion at a most frequent position obtained by the convolution operation as the second representative motion.

11. An image processing method according to claim 7, further comprising a sixth step of synthesizing the first representative motions and the second representative motion.

12. An image processing method according to claim 11, wherein the sixth step does not synthesize a shear motion.

* * * * *